United States Patent [19]

Annas et al.

[11] 4,238,977
[45] Dec. 16, 1980

[54] BANDSAW GRINDER BLADE SUPPORT

[76] Inventors: Dulin L. Annas, Rte. 7, Box 511-U, Hickory, N.C. 28601; Richard M. Teague, Rte. 1, Box 297, Taylorsville, N.C. 28681

[21] Appl. No.: 25,013
[22] Filed: Mar. 29, 1979
[51] Int. Cl.³ .............................................. B23D 63/12
[52] U.S. Cl. ..................................... 76/25 R; 269/296
[58] Field of Search .............. 76/25 R, 74; 74/230.01, 74/225, 230.05, 117 S, 230.3, 117 R, 230.9; 269/296; 248/89

[56] References Cited

U.S. PATENT DOCUMENTS

| | | | |
|---|---|---|---|
| 2,393,563 | 1/1946 | Petterson | 198/835 |
| 2,405,365 | 8/1946 | Myers | 76/25 A |
| 2,480,546 | 8/1949 | Bryson | 76/25 A |
| 3,762,229 | 10/1973 | Johnson | 74/217 S |
| 4,023,446 | 5/1977 | Annas et al. | 76/40 |

*Primary Examiner*—Othell M. Simpson
*Assistant Examiner*—Roscoe V. Parker

[57] ABSTRACT

Disclosed is an improved bandsaw grinder comprising the combination of an improved means for supporting at least a portion of a bandsaw blade in the vertical position as the teeth of the bandsaw blade are being ground, means to intermittently advance the bandsaw blade to position it for grinding, a reciprocating grinding means adapted to reciprocate into and out of contact with each sawblade tooth of the bandsaw blade as it is advanced into a grinding position. The improved means is composed of first, second and third rotatable pulley means each having a circumferential groove in their respective outer periphery, which are spaced apart one from another and lie in a common plane in a triangular configuration, said first and second pulley means being disposed respectively above and below the advancing and grinding means and the third pulley means has a plurality of grooves in its outer periphery. A bandsaw blade of continuous length is folded about itself to form a plurality of loops and is disposed in the advancing and support means. One of the loops is supported by and disposed in individual grooves of said first, second and third pulley means, and each one of the remaining loops is supported by an individual groove in said third pulley means.

6 Claims, 10 Drawing Figures

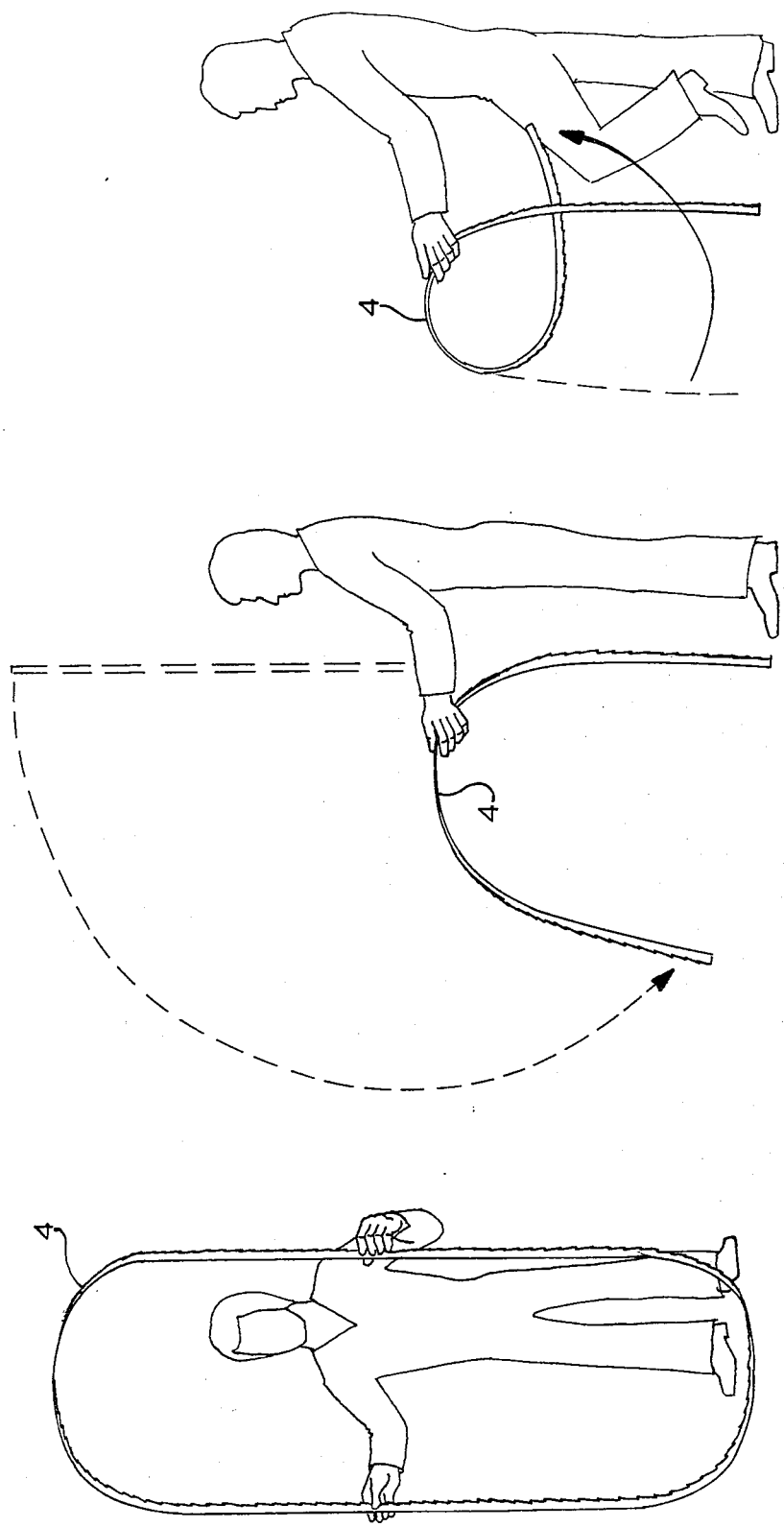

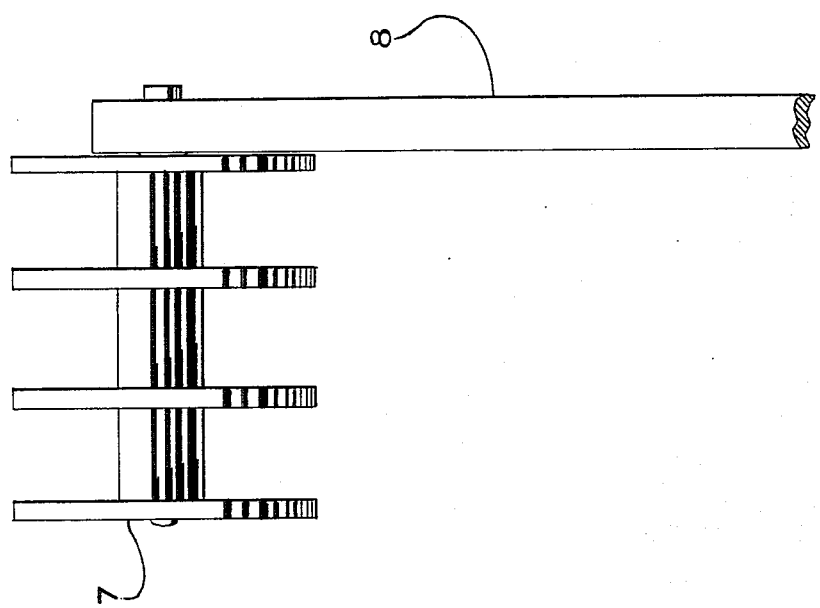
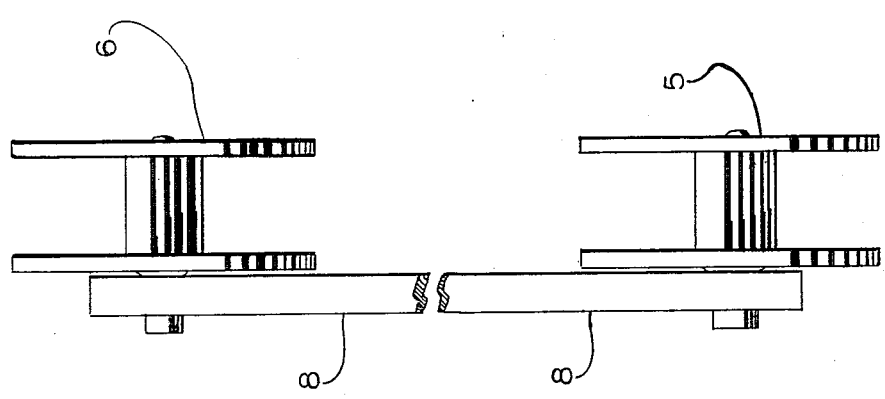

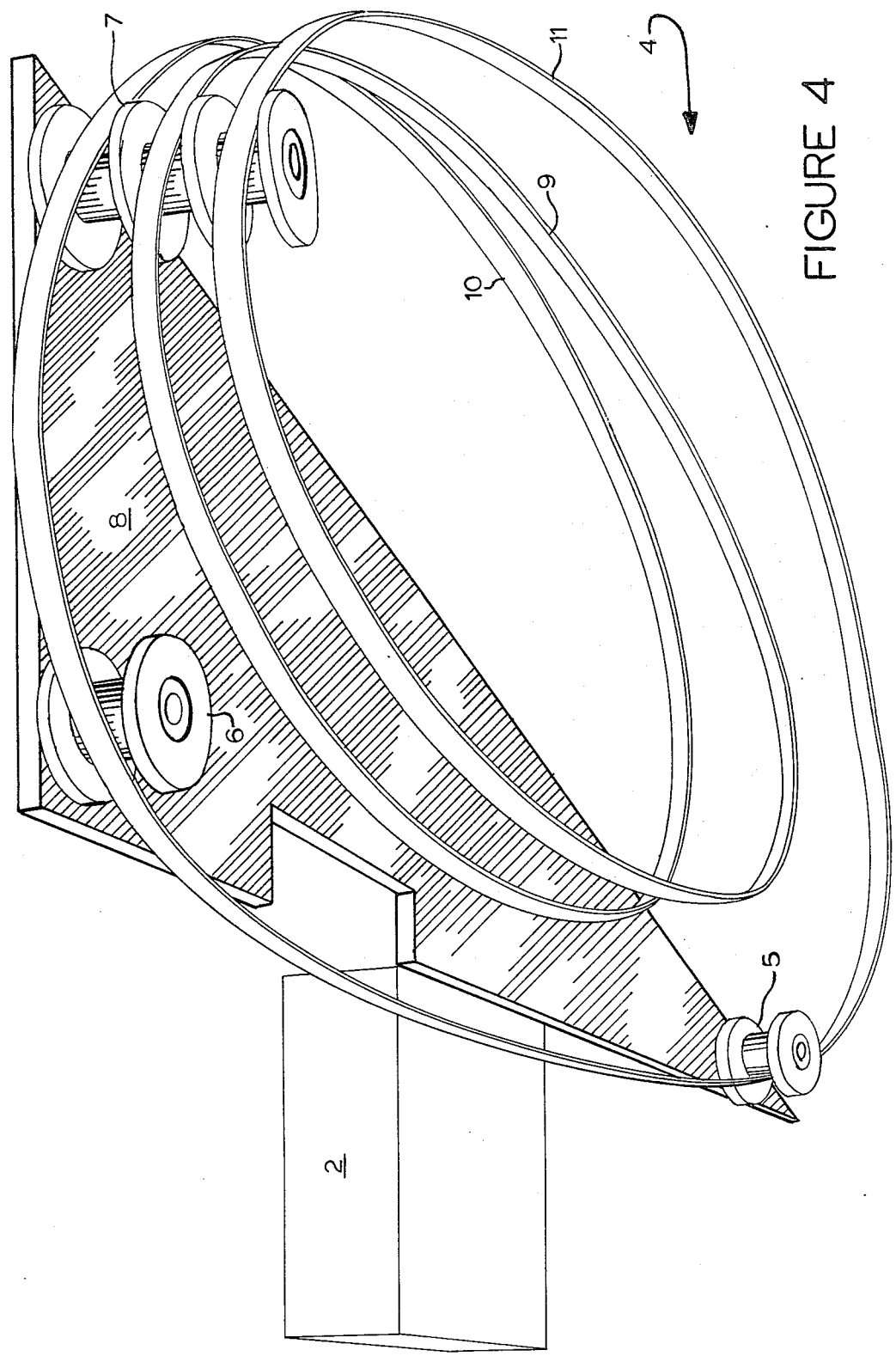

BANDSAW GRINDER BLADE SUPPORT

BACKGROUND OF THE INVENTION

The field of the invention deals with a problem of mechanically sharpening a continuous bandsaw blade in a "folded" condition, i.e., looped on itself to form a plurality of loops in a coiled configuration. A continuous bandsaw blade in its unfolded or extended condition is a single continuous loop. It can be folded, however, in such a manner to create a plurality of loops resembling a coil configuration. Instead of having to sharpen a bandsaw loop in its full extended position, i.e., in a single loop configuration, it would be desirable to sharpen the same bandsaw loop while it was folded. A single bandsaw loop folded to create a plurality of loops creates a coiled package much smaller in size and far easier to handle then a single loop. Sharpening of a bandsaw blade in this small package is the problem solved by the instant invention.

DESCRIPTION OF THE PRIOR ART

Disclosed in U.S. Pat. No. 4,023,446 is a portion of a bandsaw grinder of the character contemplated by the instant invention. In fact, the instant application is an improvement over and has a common inventorship with this patent. Disclosed in the patent is a means for sharpening a bandsaw blade by intermittently indexing the bandsaw blade into a grinding position where a reciprocating grinding means contacts the bandsaw blade with the grinding wheel in order to perform the desired chore. One of the teachings of this patent is that the bandsaw blade, as it is being sharpened, is in its fullest extended condition and thus forms a single continuous loop. For most bandsaw blades this requires a great deal of space (primarily overhead space), is cumbersome, and requires that after sharpening the blades themselves be refolded. It is in a folded state that the blades are stored for future use and are delivered to workmen for inserting into a bandsaw. Thus, it is desirable from a storage, practical and space limitations reasons to be able to sharpen the bandsaw while such bandsaw is in a folded configuration. It is to this problem that the instant problem addresses itself and discloses a solution.

The ever familiar chain saw chain is analogous to bandsaws in the environment of sharpening saws. Since it is physically impossible to fold the continuous chain saw chain into a plurality of loops, because of the nature of construction of a chain saw chain, it is therefore to be expected and the prior art teaches that chain saw chains must be sharpened or otherwise worked upon in their extended condition, namely a single continuous loop. Attention is directed to U.S. Pat. Nos. 2,393,563; 2,405,365; and 2,480,546 for such teachings. Bandsaw blades, on the other hand, can be folded, but no existing machinery is known that is capable of sharpening the blade in its folded condition.

The apparatus disclosed in U.S. Pat. No. 4,023,446 can be modified to achieve a means to sharpen a folded bandsaw blade simply by providing in combination with it the novel support means herein disclosed. As a result of such modification, the same continuous bandsaw blade of the aforementioned patent can then be folded unto itself into a plurality of loops, the loops suspended in a manner taught by the instant invention and then sharpened by using the same grinding and indexing apparatus as taught by the patent.

U.S. Pat. No. 4,023,446 speaks to improved bandsaw grinders (plural); each bandsaw grinder of the patent being identical and essentially a duplicate of the other. The bandsaw grinder of the instant invention, along with the novel support means, can also be arranged in duplicate fashion pursuant to the conceptual teachings of U.S. Pat. No. 4,023,446.

SUMMARY OF THE INVENTION

Disclosed is an improved bandsaw grinder comprising the combination of an improved means for supporting at least a portion of a bandsaw blade in the vertical position as the teeth of the bandsaw blade are being ground, means to intermittently advance the bandsaw blade to position it for grinding, a reciprocating grinding means adapted to reciprocate into and out of contact with each sawblade tooth of the bandsaw blade as it is advanced into a grinding position. The improved support means is composed of first, second and third rotatable pulley means each having a circumferential groove in their respective outer periphery, which are spaced apart one from another and lie in a common plane in a triangular configuration, said first and second pulley means being disposed respectively above and below the advancing and grinding means and the third pulley means has a plurality of grooves in its outer periphery. A bandsaw blade of continuous length is folded about itself to form a plurality of loops and is disposed in the advancing and support means. One of the loops is supported by and disposed in individual grooves in said first, second and third pulley means, and each one of the remaining loops is supported by an individual groove in said third pulley means.

BRIEF DESCRIPTION OF THE DRAWINGS

FIG. 2a is a pictorial representation of a fully extended bandsaw blade (unfolded), positioned for subsequent folding.

FIG. 2b is a pictorial representation of the first step in the folding of a continuous loop bandsaw blade.

FIG. 2c is a pictorial representation of step 3 in the folding of a continuous loop bandsaw blade.

FIG. 3a is a side elevation of two of the pulley means of FIG. 1 showing a single groove in their outer peripheral surface.

FIG. 3b is a side elevation of one of the three pulley means of FIG. 1 showing a plurality of grooves in its outer peripheral surface.

FIG. 4 is a perspective view of a folded bandsaw blade of FIG. 2f disposed on the pulley or idle wheel members of the novel support means of FIG. 1 in the manner contemplated by the instant invention.

DESCRIPTION OF THE PREFERRED EMBODIMENT

Figure 1:
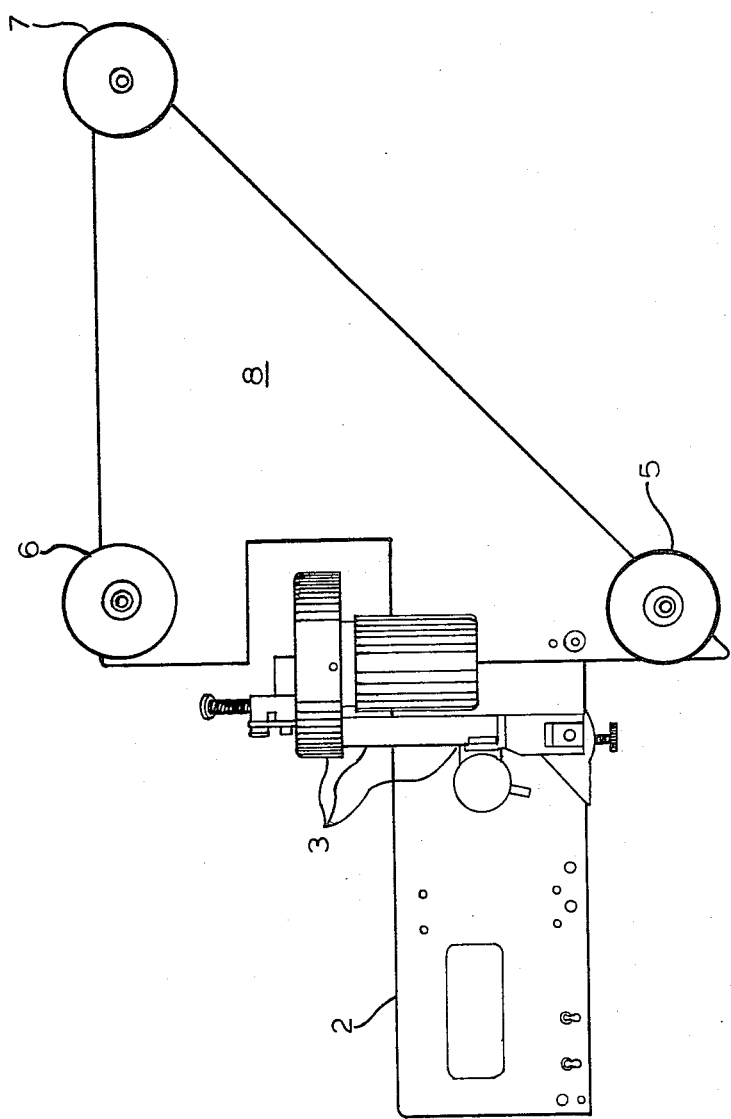
FIG. 1 is a front elevation of the novel grinder and support means.

Shown generally by element 1 in FIG. 1 is the disclosed bandsaw grinder and novel support means in operative combination. Element 2 indicates control mechanisms for operating the grinder hereinafter more fully explained. Shown generally by element 3 are means to intermittently advance a bandsaw blade into position for grinding and a reciprocating grinding means adapted to reciprocate into and out of contact with each sawblade tooth bandsaw blade as it is advanced into a grinding position. Controls 2 and element 3 are well known in the art and form no novel portion of the instant invention. Reference is made to U.S. Pat. No. 4,023,446 dated May 17, 1977 in which there is disclosed specific apparatus adapted to carry out the previously recited functions. Reference is specifically made to this patent for such apparatus as if the contents of the aforementioned patent had been faithfully reproduced herein in its entirety.

The novel portion of the instant invention consists of improved support means for the bandsaw blade indicated above by elements 5, 6 7 and 8 as such and in combination with a folded bandsaw blade. See FIG. 4. In the prior art, specifically U.S. Pat. No. 4,023,446, for each grinder unit disclosed there is a single overhead pulley or idle wheel positioned above the grinding and indexing unit, element 3 of the instant application, and the bandsaw blade is thus necessarily sharpened in its extended state, i.e., like element 4 of FIG. 2a. Pulley or idle wheels 5, 6 and 7 are provided as shown by FIG. 1 and are rotatably fixed to a triangular shaped base or backboard 8. Pulley or idle wheels 5, 6 and 7 are disposed at one of the three points where the terminal edges of triangle shaped backboard converge. It will be noted that pulleys 5 and 6 are respectively disposed below and above the grinding and indexing means 3 so as to hold blade 4 in essentially a vertical position as it passes through the grinding mechanism.

Bandsaw blade 4 is folded, as more fully explained hereafter, into a plurality of loops. See FIG. 2, the disclosed example there shown being 3 in number, denoted by elements 9, 10 and 11. Loop 11 is disposed about and trained on idle or pulley wheels 5, 6 and 7 and, as will be more fully disclosed, in respective grooves provided in the outer periphery of pulley or idle means 5, 6 and 7.

Pulley or idle wheel 7 has a plurality of grooves in its outer peripheral surface, equal in number to the number of loops contemplated. Loops 9 and 10 are disposed in an individual groove of this pulley. Once bandsaw blade 4 is folded and configurated into a plurality of loops, as shown in FIG. 1, and the folded bandsaw blade is disposed in the manner disclosed and trained in the grooves of pulley or idle wheels 5, 6 and 7 in the above described manner, the grinding operation of the bandsaw blade takes place as described in U.S. Pat. No. 4,023,446. Since the bandsaw loop represents a coil and is continuous, the grinding and indexing operation as disclosed in such patent is not affected by the coiled or looped configuration disclosed above.

Figure 2F:
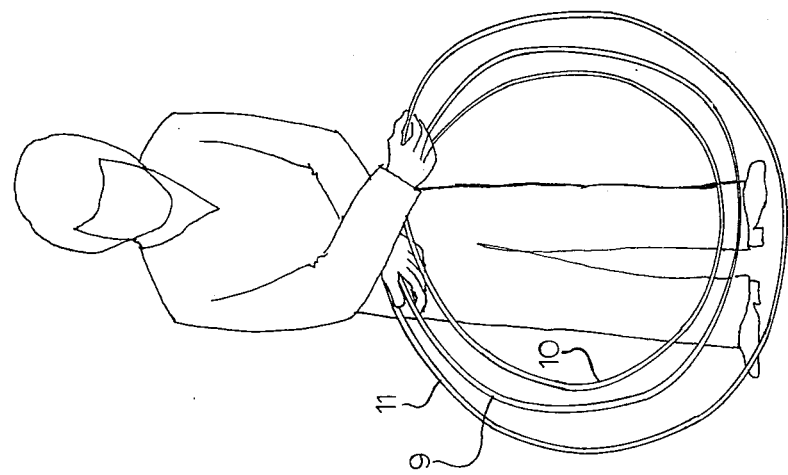
FIG. 2f is a pictorial representation of a previously fully extended bandsaw blade folded into three loops in a coiled fashion.
Figure 2E:
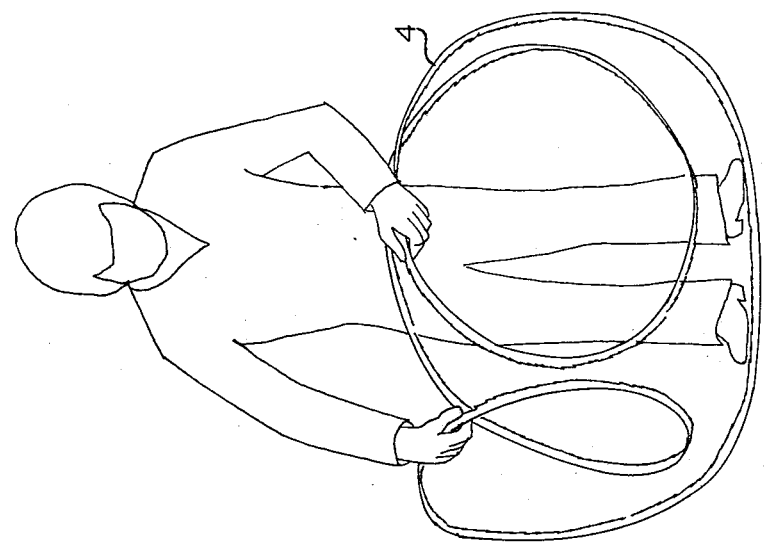
FIG. 2e is step 4 in the folding of a continuous loop bandsaw blade.
Figure 2D:
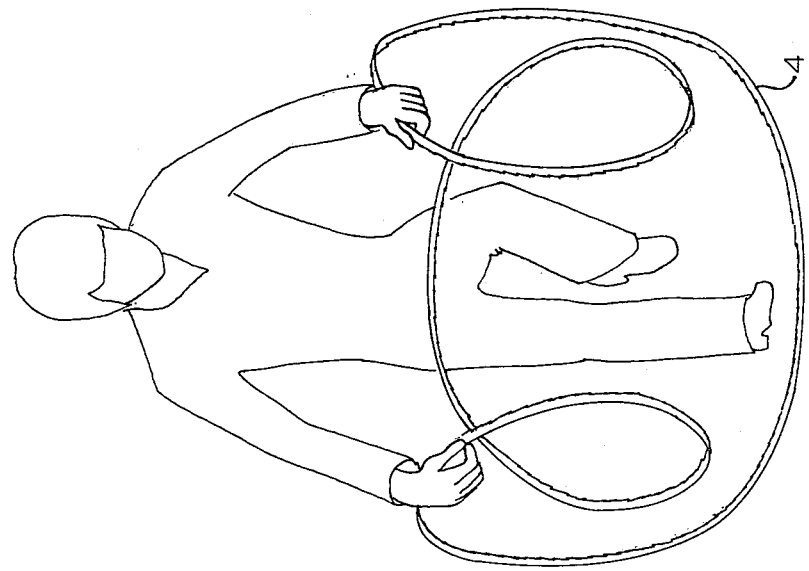
FIG. 2d is a pictorial representation of the third step in the folding of a continuous loop bandsaw blade.

FIG. 2a is a pictorial representation of the fully extended bandsaw blade noted by element 4 of FIG. 1. Shown in FIGS. 2b–2e is the manner in which such bandsaw blade can be twisted in preparation of it being folded into a plurality of loops shown in FIG. 2f.

FIG. 2f is a twisted bandsaw blade 4 of FIG. 2b folded over on to itself to form a plurality of loops, which in this case would be three in number, namely loops 9, 10, and 11. It is to be understood, however, that the number of loops is a function of the diameter of the bandsaw loop and the width of the bandsaw itself. It is to be understood that three loops are not always desired but an indefinite or indeterminate number of loops can be handled by the instant invention so long as pulley or idle wheel 7 contains a number of grooves in its outer periphery that is equal to the number of loops contemplated, i.e., three in the instant example.

Shown in FIGS. 2a through 2f is a series of pictorial representations showing how an otherwise fully extended bandsaw blade 4 can be folded into a plurality of loops in a coiled configuration, shown for example in FIG. 2f. A fully extended unfolded and untwisted bandsaw blade is shown in FIG. 2a with the teeth of the blade facing the operator. Shown in FIG. 2b is how the blade is folded in outward fashion as the operator turns the teeth of the blade inward, i.e., one side facing the other. In order to do this the left hand side of the blade is twisted clockwise and the right hand side of the blade is twisted counterclockwise. An operator using his leg for a support holds one portion of the blade as the other portion of the blade is swung downward in and up on the leg, completing the swing of the blade as shown in FIG. 2c. The configuration shown in 2d is that which is reproduced by carrying out the step in FIG. 2c. Shown in FIG. 2e either the right or the left handed loop can be formed first by pulling the blade to the middle as shown. In FIG. 2f, the folding is completed by pulling and overlapping a portion of the blade in the other hand of the operator thus giving rise to the loops shown in FIG. 2f. It is not contended by applicant that this is the only way that a continuous loop bandsaw blade can be folded or that the folding of a bandsaw blade is novel, such being believed by applicant to be well known in the prior art. However, for the sake of completeness applicant feels that an understanding of how a bandsaw blade can be folded into a plurality of loops in a coiled position is helpful in understanding the problem solved by the instant invention. This problem is pictorially represented by the size of the bandsaw blade shown in FIG. 2a in comparison to the size of the blade shown in FIG. 2f. The bandsaw blade fully extended in FIG. 2a represents the prior art mode of sharpening as taught by U.S. Pat. No. 4,023,446. The folded position, as shown by FIG. 2f, is obviously more easily handled, transported and stored and it is the sharpening of the bandsaw blade of FIG. 2a folded in its coiled position as shown in FIG. 2f that is solved by the instant invention.

Base means 8 on which the pulleys or idle wheels 5, 6 and 7 are rotatably affixed can be either a solid member as shown or a triangular shaped bracket made from angle iron or other suitable materials.

It will be appreciated that the support means described above provides a convenient and economical apparatus, easily attachable to a known grinding mechanism described in U.S. Pat. No. 4,023,446, the combination of which provides a means for continuously grinding or sharpening a continuous bandsaw belt or loop while such loop is in a coiled or folded configuration. By so doing, overhead space is conserved and convenience of transporting and storing of unsharpened and sharpened bandsaw blades is achieved. Bandsaw blades having a ¼ or ¾ inch width and a 9½ foot circumference can be easily and conveniently sharpened on the improved bandsaw grinder within a span of 10 minutes or less. It will be readily appreciated that a bandsaw blade of little less than 20 feet in circumference, if carried about in its fully extended configuration, would be cumbersome and dangerous and almost impossible to store. In its folded configuration, it would be convenient to store and transport and if it could be sharpened in such folded conditions, a greatly convenience and saving could be achieved. It is this achievement that this invention teaches.

What is claimed is:

1. A bandsaw grinder support means for supporting at least a portion of a bandsaw blade in the vertical position as its teeth are being ground adapted to be used in combination with a means to intermittently advance said bandsaw blade to position same for grinding and a reciprocating grinding means adapted to reciprocate into and out of contact with each saw blade tooth of the bandsaw blade as it is advanced into a grinding position, said support means comprising first, second and third rotatable pulley means, each having a circumferential groove in their outer periphery, spaced apart one from another and lying in a common plane, adapted to be disposed above and below said advancing and grinding means and said third pulley means having a plurality of grooves in its outer periphery.

2. A bandsaw grinder as set forth in claim 1 wherein said first, second and third pulley means form a triangle.

3. A bandsaw grinder support means as set forth in claim 1 including a bandsaw blade of continuous length folded about itself to form a plurality of loops, one of said loops being disposed in individual grooves in said first, second and third pulley means, and the balance of said loops each being supported by individual grooves in said third pulley means.

4. A bandsaw grinder as set forth in claim 2 wherein the triangular configuration formed by said first, second and third pulley means is substantially isosceles in shape.

5. A bandsaw grinder support means for supporting at least a portion of a bandsaw blade in the vertical position as its teeth are being ground adapted to be used in combination with a means to advance the bandsaw blade to a position for grinding and a grinding means adapted to come into contact with each saw blade tooth of the bandsaw blade as it is advanced into a grinding position, said support means comprising first, second and third rotatable pulley means, each having a circumferential groove in its outer periphery, spaced apart one from another and lying in a common plane, adapted to be disposed above and below said grinding means and said third pulley means having a plurality of grooves in its outer periphery.

6. A support means as set forth in claim 5 wherein said triangular configuration is essentially an isosceles triangle.

* * * * *